US010968356B2

(12) United States Patent
Ganapathiappan et al.

(10) Patent No.: US 10,968,356 B2
(45) Date of Patent: Apr. 6, 2021

(54) COALESCENT INK

(71) Applicant: Hewlett-Packard Development Company, L.P., Houston, TX (US)

(72) Inventors: Sivapackia Ganapathiappan, Palo Alto, CA (US); Howard S Tom, Palo Alto, CA (US); Yan Zhao, Palo Alto, CA (US); Kristopher J Erickson, Palo Alto, CA (US); Krzysztof Nauka, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 273 days.

(21) Appl. No.: 15/764,863

(22) PCT Filed: Jan. 27, 2016

(86) PCT No.: PCT/US2016/015056
§ 371 (c)(1),
(2) Date: Mar. 29, 2018

(87) PCT Pub. No.: WO2017/131652
PCT Pub. Date: Aug. 3, 2017

(65) Prior Publication Data
US 2018/0320009 A1 Nov. 8, 2018

(51) Int. Cl.
| *C09D 11/322* | (2014.01) |
| *C09D 11/32* | (2014.01) |
| *C09D 11/36* | (2014.01) |
| *C09D 11/106* | (2014.01) |
| *C09D 11/30* | (2014.01) |
| *C09D 11/033* | (2014.01) |
| *B33Y 10/00* | (2015.01) |
| *B33Y 70/00* | (2020.01) |
| *B29C 64/165* | (2017.01) |
| *C09D 11/023* | (2014.01) |
| *C09D 11/037* | (2014.01) |
| *C09D 11/101* | (2014.01) |
| *C09D 11/102* | (2014.01) |
| *B29K 105/00* | (2006.01) |

(52) U.S. Cl.
CPC .......... *C09D 11/322* (2013.01); *B29C 64/165* (2017.08); *B33Y 10/00* (2014.12); *B33Y 70/00* (2014.12); *C09D 11/023* (2013.01); *C09D 11/033* (2013.01); *C09D 11/037* (2013.01); *C09D 11/101* (2013.01); *C09D 11/102* (2013.01); *C09D 11/106* (2013.01); *C09D 11/30* (2013.01); *C09D 11/32* (2013.01); *C09D 11/36* (2013.01); *B29K 2105/251* (2013.01)

(58) Field of Classification Search
CPC ....... C09D 11/32; C09D 11/106; C09D 11/30; C09D 11/102; C09D 11/023; B33Y 70/00
USPC .................................................. 523/160, 161
See application file for complete search history.

(56) References Cited

U.S. PATENT DOCUMENTS

| 8,963,135 | B2 | 2/2015 | Nikonov et al. | |
| 2007/0238056 | A1 | 10/2007 | Baumann et al. | |
| 2008/0187651 | A1* | 8/2008 | Lee ........................ | C09D 11/52 427/77 |
| 2009/0121618 | A1* | 5/2009 | Lyon ...................... | C09D 11/30 313/504 |
| 2010/0239871 | A1 | 9/2010 | Scheffer et al. | |
| 2010/0302300 | A1 | 12/2010 | Verdonck | |
| 2011/0135884 | A1 | 6/2011 | Lettow et al. | |
| 2012/0288627 | A1 | 11/2012 | Hodges et al. | |
| 2014/0089708 | A1 | 6/2014 | Fournier et al. | |
| 2014/0257518 | A1 | 9/2014 | McAlpine et al. | |

FOREIGN PATENT DOCUMENTS

| CA | 2286446 | 1/2007 |
| CN | 101228645 | 7/2008 |
| CN | 1740367 | 11/2009 |
| CN | 102146151 | 8/2011 |
| CN | 102344546 | 2/2012 |
| EP | 0803553 | 10/1997 |
| JP | 2007534524 | 11/2007 |
| WO | WO-2014089708 | 6/2014 |

OTHER PUBLICATIONS

Graham, Elizabeth G. et al., 'Review of metal, carbon and polymer nanoparticles for infrared photothermal therapy.' Nano Life, 2013, vol. 3, No. 3, Article No. 133002 (29 pages).

* cited by examiner

*Primary Examiner* — Doris L Lee
(74) *Attorney, Agent, or Firm* — Thorpe, North & Western LLP

(57) ABSTRACT

The present disclosure is drawn to coalescent inks and material sets, such as for 3D printing. In one example, the coalescent ink can include a conjugated polymer, a colorant imparting a visible color to the coalescent ink, and an ink vehicle comprising a high boiling point co-solvent having a boiling point of 250° C. or greater. The high boiling point co-solvent can be present in an amount from about 1 wt % to about 4 wt % with respect to the coalescent ink.

18 Claims, 3 Drawing Sheets

COALESCENT INK

BACKGROUND

Methods of 3-dimensional (3D) digital printing, a type of additive manufacturing, have continued to be developed over the last few decades. However, systems for 3D printing have historically been very expensive, though those expenses have been coming down to more affordable levels recently. In general, 3D printing technology improves the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefited from the ability to rapidly prototype and customize parts for customers.

Various methods for 3D printing have been developed, including heat-assisted extrusion, selective laser sintering, photolithography, as well as others. In selective laser sintering, a powder bed is exposed to point heat from a laser to melt the powder wherever the object is to be formed. This method can be slow, e.g., may take more than eight hours to produce a simple part. The resulting part also lacks edge accuracy and smoothness. Additionally, this method does not produce colored objects very easily. It has also been an expensive method, with the system cost typically exceeding $200,000. Accordingly, development of new 3D printing technologies continues.

DETAILED DESCRIPTION

Figure 1:
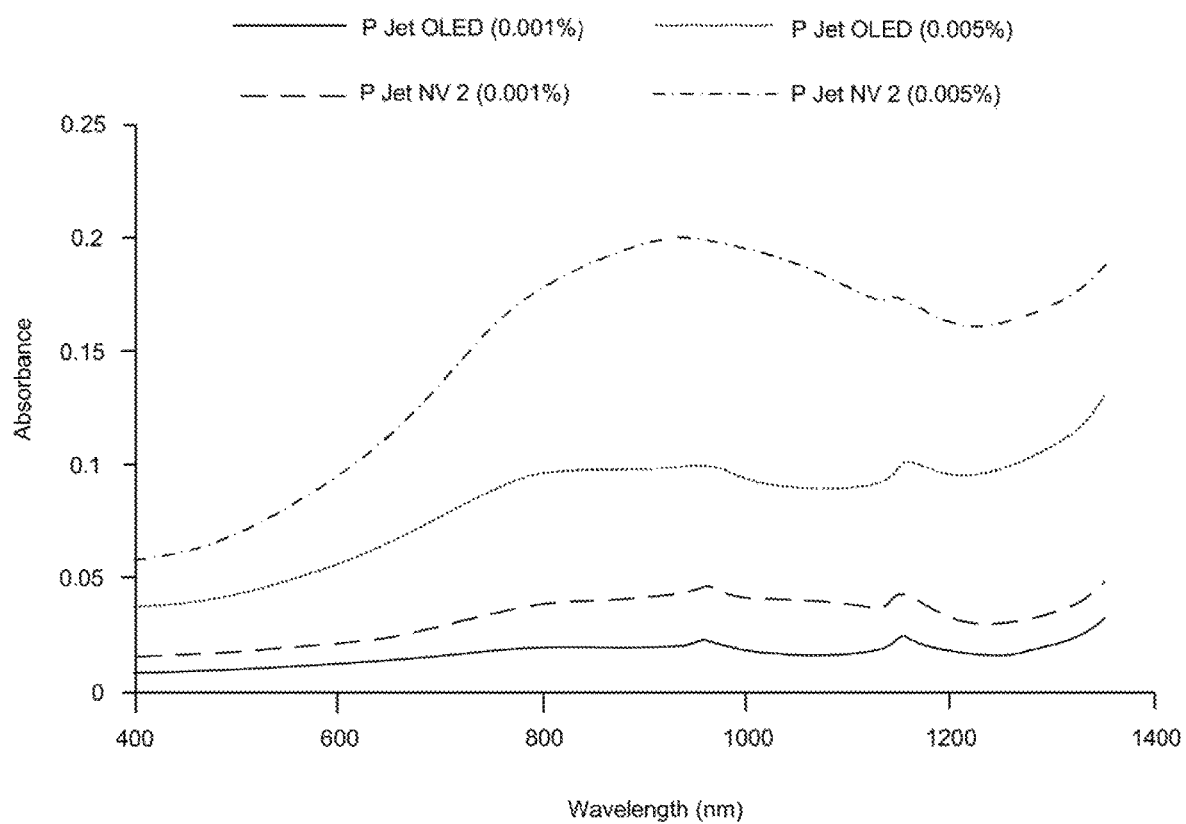
FIG. 1 illustrates absorption spectrum for several dispersions of water-dispersible conjugated polymers in accordance with examples of the present disclosure.

The present disclosure is drawn to coalescent inks, material sets, and methods, such as for printing 3D parts. For example, in light area processing (LAP), a thin layer of polymer powder is spread on a bed to form a powder bed. A printing head, such as an inkjet print head, is then used to print a coalescent ink over portions of the powder bed corresponding to a thin layer of the three dimensional object to be formed. Then, the bed is exposed to a light source, e.g., typically the entire bed. The coalescent ink absorbs more energy from the light than the unprinted powder. The absorbed light energy is converted to thermal energy, causing the printed portions of the powder to melt and coalesce. This forms a solid layer. After the first layer is formed, a new thin layer of polymer powder is spread over the powder bed and the process is repeated to form additional layers until a complete 3D part is printed. In accordance with the present technology, this LAP process can achieve fast throughput with good accuracy.

To absorb and convert the light energy to thermal energy, conjugated polymers can be used as absorbers in the coalescent inks. These conjugated polymers can absorb light wavelengths in the range of about 800 nm to 1400 nm (in the near infrared range) and convert the absorbed light energy to thermal energy. When used with a light source that emits a wavelength in this range and a polymer powder that has a low absorbance in this range, the conjugated polymer causes the printed portions of the polymer powder to melt and coalesce without melting the remaining polymer powder. The conjugated polymers can be just as efficient or even more efficient at generating heat and coalescing the polymer powder when compared to carbon black (which is also effective at absorbing light energy and heating up the printed portions of the powder bed, but has the disadvantage of always providing black or gray parts in color).

As used herein, "conjugated" refers to alternating double and single bonds between atoms in a molecule. Thus, "conjugated polymer" refers to a polymer that has a backbone with alternating double and single bonds.

According to the present technology, coalescent inks can be formulated with conjugated polymers so that the conjugated polymer has substantially no impact on the apparent color of the ink. This allows the formulation of colorless coalescent inks that can be used to coalesce the polymer powder, but which will not impart noticeably visible color to the polymer powder. Alternatively, the coalescent inks can include a colorant such as pigments and/or dyes to give the inks a color such as cyan, magenta, yellow, red, blue, green, orange, violet, black, etc. Such colored coalescent inks can be used to print colored 3D parts with acceptable optical density. The coalescent inks can also be formulated with conjugated polymers that are stable in the ink vehicle and that provide good ink jetting performance. In some examples, the conjugated polymers can be water-soluble, water-dispersible, organic-soluble, or organic-dispersible. The conjugated polymers can also be compatible with the polymer powder so that jetting the ink onto the polymer powder provides adequate coverage and interfiltration of the conjugated polymers into the powder.

The conjugated polymer can therefore be selected based on its absorption spectrum, its solubility or dispersibility in the ink vehicle, and its compatibility with the polymer powder. FIG. 1 shows absorption spectra for two different conjugated polymer dispersions at two different concentrations. The solid line indicates a 0.001% dispersion of water-dispersible poly(3,4-ethylenedioxythiophene)-poly(styrenesulfonate) (PEDOT:PSS) available by the trade name Clevios™ P Jet (OLED) from Heraeus. The dashed line indicates another 0.001% dispersion of PEDOT:PSS available by the trade name Clevios™ P Jet NV 2 from Heraeus. The dotted line indicates a 0.005% dispersion of P Jet (OLED) and the dotted and dashed line indicates a 0.005% dispersion of P Jet NV 2. Each of these conjugated polymer dispersions has a comparatively low absorbance in the visible light range, which is about 400 nm to 700 nm. However, each conjugated polymer has a broad, high absorbance in the range of 800 nm to 1400 nm.

The conjugated polymer is of course not limited to the conjugated polymers illustrated in the figures or the conjugated polymers listed above. Other conjugated polymers can also be suitable. In one example, the coalescent ink can include a conjugated polymer having a peak absorption wavelength from 800 nm to 1400 nm, wherein the conjugated polymer includes PEDOT:PSS. In other examples, the conjugated polymer can include PEDOT:PSS, a polythiophene, poly(p-phenylene sulfide), a polyaniline, a poly(pyrrole), a poly(acetylene), poly(p-phenylene vinylene), polyparaphenylene, or combinations thereof. The coalescent ink can also include a colorant, e.g., a pigment or dye that imparts a visible color to the coalescent ink and an aqueous ink vehicle.

In some examples, the concentration of conjugated polymer in the coalescent ink can be from 0.1 wt % to 10 wt %. In one example, the concentration of conjugated polymer in the coalescent ink can be from 0.1 wt % to 8 wt %. In another example, the concentration can be from 0.1 wt % to 5 wt %. In yet another example, the concentration can be from 0.5 wt % to 2 wt %. In a particular example, the concentration can be from 0.5 wt % to 1.2 wt %.

The concentration can be adjusted to provide a coalescent ink in which the visible color of the coalescent ink is not substantially altered by the conjugated polymer. Although conjugated polymers generally have low absorbance in the visible light range, the absorbance is usually greater than zero. Therefore, the conjugated polymers can typically absorb some visible light, but their color in the visible spectrum is minimal enough that it does not substantially impact the ink's ability to take on another color when a colorant is added (unlike carbon black which dominates the ink's color with gray or black tones). The conjugated polymers in concentrated form can have a visible color, such as blue or other colors depending on the absorption spectrum of the specific conjugated polymer. Accordingly, the concentration of the conjugated polymer in the coalescent ink can be adjusted so that the conjugated polymer is not present in such a high amount that it alters the visible color of the coalescent ink. For example, a conjugated polymer with a very low absorbance of visible light wavelengths can be included in greater concentrations compared to a conjugated polymer with a relatively higher absorbance of visible light. These concentrations can be adjusted based on a specific application with some experimentation.

In further examples, the concentration of the conjugated polymer can be high enough that the conjugated polymer impacts the color of the coalescent ink, but low enough that when the ink is printed on a polymer powder, the conjugated polymer does not impact the color of the polymer powder. The concentration of the conjugated polymer can be balanced with the amount of coalescent ink that is to be printed on the polymer powder so that the total amount of conjugated polymer that is printed onto the polymer powder is low enough that the visible color of the polymer powder is not impacted. In one example, the conjugated polymer can have a concentration in the coalescent ink such that after the coalescent ink is printed onto the polymer powder, the amount of conjugated polymer in the polymer powder is from 0.0003 wt % to 5 wt % with respect to the weight of the polymer powder.

The conjugated polymer can have a temperature boosting capacity sufficient to increase the temperature of the polymer powder above the melting or softening point of the polymer powder. As used herein, "temperature boosting capacity" refers to the ability of a conjugated polymer to convert near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the coalescent ink is printed on a portion of the polymer powder, the conjugated polymer can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce or be sintered together at temperatures slightly below the melting point or softening point. Therefore, as used herein "melting point" and "softening point" can include temperatures slightly lower, such as up to about 20'C lower, than the actual melting point or softening point.

In one example, the conjugated polymer can have a temperature boosting capacity from about 10° C. to about 70° C. for a polymer with a melting or softening point from about 100° C. to about 350° C. If the powder bed is at a temperature within about 10° C. to about 70'C of the melting or softening point, then such a conjugated polymer can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The coalescent ink can then be printed onto the powder and the powder bed can be irradiated with a near-infrared light to coalesce the printed portion of the powder.

The conjugated polymers described herein provide several advantages over near-infrared absorbing dyes that might alternative be used as the IR absorber. The conjugated polymers tend to have broad absorption spectra in the near-infrared range, whereas the dyes typically had narrow absorption ranges. Therefore, the conjugated polymers can absorb more energy and boost the temperature of the printed portion of the powder bed while using a lower concentration of the conjugated polymer compared to the previous near-infrared absorbing dyes. Coalescent inks containing the conjugated polymers can have better fusing efficiency than with the near-infrared absorbing dyes, allowing for printing denser parts with better mechanical properties. The dyes also often had higher absorption in the visible range, thus producing a darker visible color in the printed part.

In some examples, using a conjugated polymer in the coalescent ink can also improve the mechanical properties of printed parts because the conjugated polymers themselves are incorporated into the fused polymers making up the printed part. The coalescent ink can interfiltrate between polymer particles. When the particles are fused by IR radiation, the conjugated polymer can remain between the particles, occupying some of the space between the fusing particles. Thus, the conjugated polymer can increase interlayer adhesion between layers of fused particles, increase the density of the printed part, and improve the surface finish of the printed part by making the surface smoother.

The conjugated polymers can also have better thermal stability compared to the previous near-infrared absorbing dyes. As used herein, "thermal stability" refers to the ability of a material to maintain a consistent absorption of IR energy after being exposed to high temperatures. Near-infrared absorbing dyes, on the other hand, tend to change in color as the dyes degrade during the ink making process, the 3-dimensional printing process, and/or ageing of the final printed part. The conjugated polymers described herein can have a much more consistent color and IR absorption because the conjugated polymers do not degrade over time or upon exposure to the temperatures used in 3-dimensional printing.

In some examples, the conjugated polymers can also impart new functionalities or properties to the printed part, such as electrical conductivity, semiconductivity, and antistatic properties.

The coalescent ink can also include a pigment or dye colorant that imparts a visible color to the coalescent ink. In some examples, the colorant can be present in an amount from 0.5 wt % to 10 wt % in the coalescent ink. In one example, the colorant can be present in an amount from 1 wt % to 5 wt %. In another example, the colorant can be present in an amount from 5 wt % to 10 wt %. However, the colorant is optional and in some examples the coalescent ink can include no additional colorant. These coalescent inks can be used to print 3D parts that retain the natural color of the polymer powder. Additionally, coalescent ink can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasoli Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Pallogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal@) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B. and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostapermn Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000. Raven® 5750, Raven® 5250, Raven® 5000, and Raven® 3500. The following pigment is available from Sun Chemical: LHD9303 Black. Any other pigment and/or dye can be used that is useful in modifying the color of the coalescent ink and/or ultimately, the printed part.

The colorant can be included in the coalescent ink to impart color to the printed object when the coalescent ink is jetted onto the powder bed. Optionally, a set of differently colored coalescent inks can be used to print multiple colors. For example, a set of coalescent inks including any combination of cyan, magenta, yellow (and/or any other colors), colorless, white, and/or black coalescent inks can be used to print objects in full color. Alternatively or additionally, a colorless coalescent ink can be used in conjunction with a set of colored, non-coalescent inks to impart color. In some examples, a colorless coalescent ink containing a conjugated polymer can be used to coalesce the polymer powder and a separate set of colored or black or white inks not containing the conjugated polymer can be used to impart color.

The components of the coalescent ink can be selected to give the ink good ink jetting performance and the ability to color the polymer powder with good optical density. Besides the conjugated polymer and the colorant, if present, the coalescent ink can include a liquid vehicle. In some examples, the liquid vehicle formulation can Include water and one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water. In some examples, a water-dispersible conjugated polymer can be used with an aqueous vehicle. Because the conjugated polymer is dispersible in water, an organic co-solvent is not necessary to solubilize the conjugated polymer. Therefore, in some examples the coalescing ink can be substantially free of organic solvent. However, in other examples a co-solvent can be used to help disperse other dyes or pigments, or improve the jetting properties of the ink. In still further examples, a non-aqueous vehicle can be used with an organic-soluble or organic-dispersible conjugated polymer.

In certain examples, a high boiling point co-solvent can be included in the ink. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the ink at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, various other additives can be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

In one non-limiting example, the liquid vehicle can include the components and amounts as shown in Table 1:

TABLE 1

| Ingredients | Wt (%) |
|---|---|
| 2-Pyrrolidinone | 50-75 |
| 2-Methyl-1,3-Propanediol | 5-12 |
| Tetraethylene glycol | 5-12 |
| LEG-1 | 5-10 |
| Surfynol ® CT151 surfactant from Air Products and Chemicals, Inc. | 0.2-1.2 |
| Zonyl ® FSO fluorosurfactant from DuPont | 0.01-1 |
| SMA1440H | 1-5 |
| Tris base | 0.1-1 |

In another non-limiting example, the liquid vehicle can include the components and amounts as shown in Table 2:

TABLE 2

| Ink Components | Wt (%) |
|---|---|
| 2-Pyrrolidinone | 50-100 |
| Crodafos N3 ™ surfactant from Croda | 0.1-5 |

In yet another non-limiting example, the liquid vehicle can include the components and amounts as shown in Table 3:

TABLE 3

| Component | Wt. % |
|---|---|
| 2-methyl-1,3-propanediol | 10-40 |
| Crodafos N3 ™ surfactant from Croda | 0.1-5 |
| Tergitol ™ 15-S-12 surfactant from Dow Chemical Company | 0.1-3 |
| Zonyl ® FSO-100 fluorosurfactant from DuPont | 0.5-5 |
| Proxel ™ GXL (20% as is) biocide from Lonza | 0.1-1 |

In still another non-limiting example, the liquid vehicle can include the components and amounts as shown in Table 4:

TABLE 4

| Component | Wt. % |
|---|---|
| 2-Hydroxyethyl-2-Pyrrolidone | 5-20 |
| Dantocol ™ DHE bonding agent from Lonza | 30-80 |
| LEG | 1-20 |
| Crodafos N3 ™ surfactant from Croda | 1-20 |
| Surfynol ® SEF (75% as is) surfactant from Air Products and Chemicals, Inc. | 1-10 |
| Kordek ™ MLX (10% as is) biocide from Dow Chemical Company | 0.1-5 |
| Proxel ™ GXL (20% as is) biocide from Lonza | 0.1-5 |

In a further non-limiting example, the liquid vehicle can include the components and amounts as shown in Table 5:

TABLE 5

| Ink vehicle components | Wt. % |
|---|---|
| Tripropylene glycol | 20-60 |
| 1-(2-Hydroxyethyl)-2-imidazolidinone | 20-40 |
| LEG-1 | 0.5-5 |
| Crodafos N3 ™ suractant from Croda | 1-6 |
| Tergitol ™ 15-S-7 surfactant from Dow Chemical Company | 1-6 |
| Zonyl ® FSO fluorosurfactant from DuPont | 0.1-1.2 |
| Proxel ™ GXL biocide from Lonza | 0.1-1.2 |

It is noted the liquid vehicle formulations of Tables 1 to 5 are provided by example only and other formulations with similar properties can likewise be formulated in accordance with the present technology.

The present technology also includes material sets, such as for 3D powder bed printing. A material set for 3D powder bed printing can include a coalescent ink containing a conjugated polymer having a peak absorption wavelength from 800 nm to 1400 nm and an ink vehicle. The material set can also include a particulate polymer formulated to coalesce when contacted by the coalescent ink and irradiated by a near-infrared energy emitting the peak absorption wavelength. The coalescent ink can include any of the components described herein.

The particulate polymer can be a polymer powder. In one example, the polymer powder can have an average particle size from 10 to 100 microns. The particles can have a variety of shapes, such as substantially spherical particles or irregularly-shaped particles. In some examples, the polymer powder can be capable of being formed into 3D printed parts with a resolution of 10 to 100 microns. As used herein, "resolution" refers to the size of the smallest feature that can be formed on a 3D printed part. The polymer powder can form layers from about 10 to about 100 microns thick, allowing the coalesced layers of the printed part to have roughly the same thickness. This can provide a resolution in the z-axis direction of about 10 to about 100 microns. The polymer powder can also have a sufficiently small particle size and sufficiently regular particle shape to provide about 10 to about 100 micron resolution along the x-axis and y-axis.

In some examples, the particulate polymer can be colorless. For example, the particulate polymer can have a white, translucent, or transparent appearance. In combination with a coalescing ink having an invisible conjugated polymer and no additional colorant, this can provide a printed part that is white, translucent, or transparent. In other examples, the particulate polymer can be colored for producing colored parts. In still other examples, when the polymer powder is white, translucent, or transparent, color can be imparted to the part by the coalescent ink or other ink, as previously described.

The particulate polymer can have a melting or softening point from about 70° C. to about 350° C. In further examples, the polymer can have a melting or softening point from about 150° C. to about 200° C. A variety of thermoplastic polymers with melting points or softening points in these ranges can be used. For example, the particulate polymer can be selected from the group consisting of nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, and mixtures thereof. In a specific example, the particulate polymer can be nylon 12, which can have a melting point from about 175° C. to about 200° C. In another specific example, the particulate polymer can be thermoplastic polyurethane.

The particulate polymer and the conjugated polymer used in the coalescent ink can be selected to have compatible properties. For example, the conjugated polymer, when printed on a portion of the particulate polymer, can have a sufficient temperature boosting capacity so that the printed portion of the particulate polymer increases in temperature by at least 10° C. more than a non-printed portion of the particulate polymer when both the printed portion and the non-printed portion are irradiated with a wavelength of about 800 nm to about 1400 nm.

In some examples, the conjugated polymer can interfiltrate into the particulate polymer and passivate surfaces of the polymer particles. In one example, the liquid vehicle of the coalescent ink can evaporate after the ink is printed onto the polymer particles. This leaves behind the conjugated polymer molecules and other pigments and dyes, if present, on the surfaces of the polymer particles. Because coalescence of the polymer particles depends strongly on melting or softening of the surfaces of the particles, the conjugated polymers at the surfaces can provide efficient coalescence of the particles.

Figure 2:
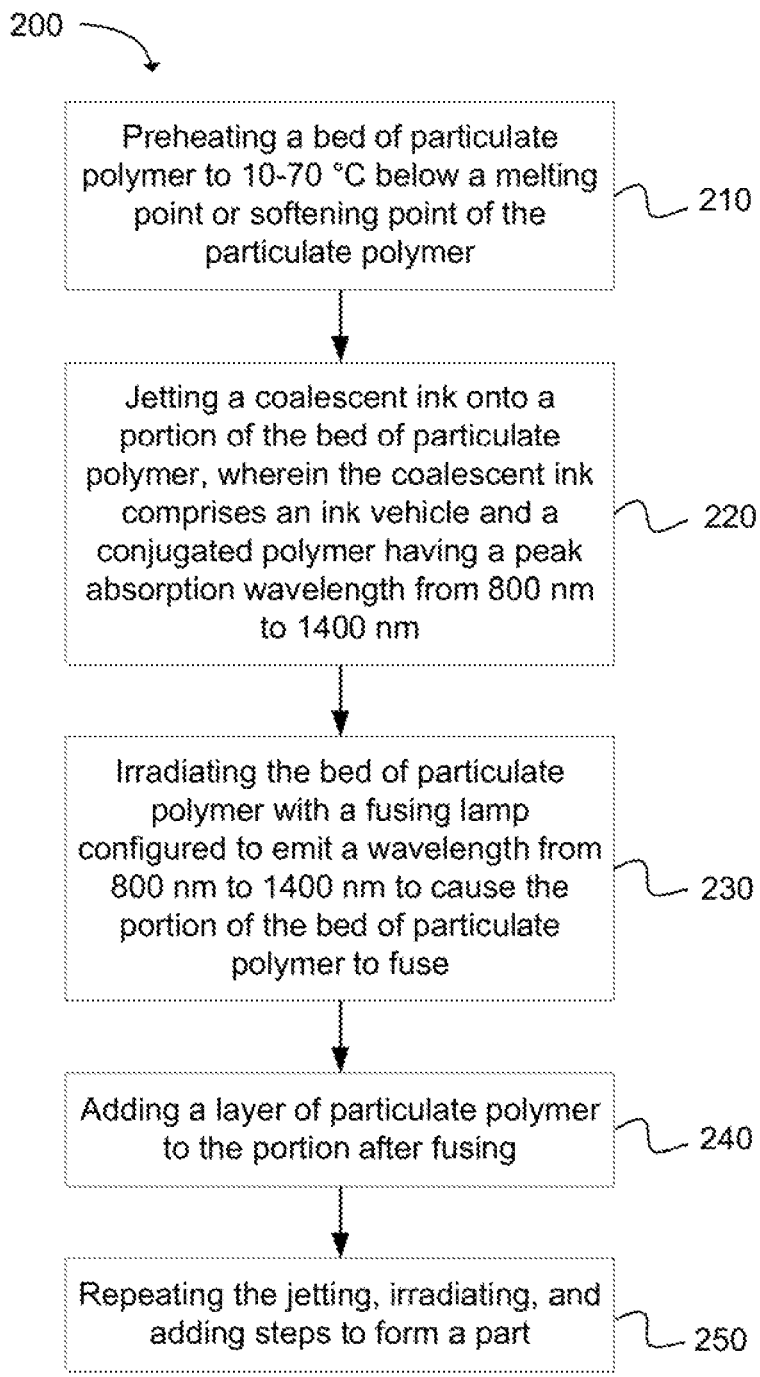
FIG. 2 is a flowchart illustrating a method for forming a 3D printed part in accordance with examples of the present disclosure.

FIG. 2 is a flowchart of a method 200 for forming a 3D printed part. The method includes preheating 210 a bed of particulate polymer to about 10° C. to about 70° C. below a melting point or softening point of the particulate polymer. Additional steps include jetting 220 a coalescent ink onto a portion of the bed of particulate polymer, wherein the coalescent ink includes a conjugated polymer having a peak absorption wavelength between 800 nm and 1400 nm and an ink vehicle; and irradiating 230 the bed of particulate polymer with a fusing lamp configured to emit a wavelength from 800 nm to 1400 nm to cause the portion of the bed of particulate polymer to fuse. Additionally, steps of adding 240 a layer of particulate polymer to the portion after fusing, and repeating 450 the jetting, irradiating, and adding steps to form a part, can also be carried out.

In one example, the bed of particulate polymer can be formed by introducing polymer powder from a polymer powder supply and rolling the powder in a thin layer using a roller. The coalescent ink can be jetted using a conventional ink jet print head, such as a thermal ink jet (TIJ) printing system. The amount of coalescent ink printed can be calibrated based on the concentration of conjugated polymer in the ink, the temperature boosting capacity of the conjugated polymer, among other factors. The amount of conjugated polymer printed can be sufficient to contact conjugated polymer with the entire layer of polymer powder. For example, if each layer of polymer powder is 100 microns thick, then the coalescent ink can penetrate at least 100 microns into the polymer powder. Thus the conjugated polymer can heat the polymer powder throughout the entire layer so that the layer can coalesce and bond to the layer below. After forming a solid layer, a new layer of loose powder can be formed, either by lowering the powder bed or by raised the height of the roller and rolling a new layer of powder.

The entire powder bed, or a portion of the powder bed, can be preheated to a temperature below the melting or softening point of the polymer powder. In one example, the preheat temperature can be from about 10° C. to about 70° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with one or more lamps, an oven, a heated support bed, or other types of heaters. In some examples, the entire powder bed can be heated to a substantially uniform temperature.

The powder bed can be irradiated with a fusing lamp configured to emit a wavelength from 800 nm to 1400 nm. Suitable fusing lamps can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with conjugated polymers leaving the unprinted portions of the polymer powder below the melting or softening point.

In one example, the fusing lamp can be matched with the conjugated polymer so that the fusing lamp emits wavelengths of light that match the highest absorption wavelengths of the conjugated polymer. A conjugated polymer with a narrow peak at a particular near-infrared wavelength can be used with a fusing lamp that emits a narrow range of wavelengths at approximately the peak wavelength of the conjugated polymer. Similarly, a conjugated polymer that absorbs a broad range of near-infrared wavelengths can be used with a fusing lamp that emits a broad range of wavelengths. Matching the conjugated polymer and the fusing lamp in this way can increase the efficiency of coalescing the polymer particles with the conjugated polymer printed thereon, while the unprinted polymer particles do not absorb as much light and remain at a lower temperature.

Depending on the amount of conjugated polymer present in the polymer powder, the absorbance of the conjugated polymer, the preheat temperature, and the melting or softening point of the polymer, an appropriate amount of irradiation can be supplied from the fusing lamp. In some examples, the fusing lamp can irradiate each layer from about 0.5 to about 10 seconds.

In some cases, modifying inks can be used to address thermal bleed so as to improve the surface quality of the final printed part. The modifying inks can include materials having low thermal conductivity such as potassium iodide, sodium iodide or potassium sulfate. The modifying inks can be printed at boundaries between coalescing portions and non-coalescing portions, to slow heat dissipation from the coalescing portions to neighboring polymer particles. This can improve separation between the fused and unfused areas of the powder bed.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and/or conjugated polymers, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," when referring to a conjugated polymer, refers to the conjugated polymer having a solubility percentage of more than 5 wt %.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

An inkjet ink was formulated using including 0.5 wt % of Clevios™ P Jet (OLED) from Heraeus, which is a PEDOT:PSS dispersion that acts as an IR absorber in the inkjet ink. This dispersion was added to an ink vehicle consisting of components such as 2-pyrrolidinone, 2-methyl-1,3-propanediol, tetraethylene glycol, liponic ester, surfynol CT151, Zonyl FSO and tris base. The ink vehicle was mixed with the PEDOT:PSS dispersion and water so that the ink vehicle was present in an amount of 30 wt % in the final ink, and the overall content of PEDOT:PSS in the final ink was 0.5 wt %. This ink was tested on a Thermal Inkjet PicoJetting System (TIPS) testbed with a number 42 printhead. The drop size was 10 picoliters. The ink jetted perfectly with excellent drop velocity of greater than 20 meters per second at 24 volts with a 2 microsecond pulse.

The ink was then tested in LAP 3-dimensional printing. A 100 micron layer of nylon 12 powder was heated to 150° C. and then the ink was printed to form a shape. The powder was then exposed to an infrared lamp. The infrared lamp emits radiation corresponding to blackbody radiation at a temperature of 2200° C. The infrared lamp has a $\lambda_{max}$ wavelength of about 1100 nm and quickly forms a tail end at higher wavelengths. This exposure raised the temperature, causing the printed nylon 12 particles to fuse. Another layer of 100 micron thickness of nylon 12 powder was coated over the bed and the process was repeated to obtain the final part. The final part was retrieved from the build bed and cleaned by mild sand blasting. The final part obtained had a light blue color, with good color consistency. Further optimization can yield good mechanical properties. Post annealing of the part can also increase the mechanical properties without altering the accuracy of the part.

Example 2

An inkjet ink was formulated according to Example 1, except that the PEDOT:PSS dispersion was Clevios™ P Jet NV 2 from Heraeus. The ink was tested in a TIPS as in Example 1, and showed the same results. The ink was tested in LAP 3-dimensional printing as in Example 1. The final part obtained had a light blue color, with good color consistency.

Example 3

A comparative ink was formulated according to Example 1, except that a near-infrared absorbing dye (FHI 104422P from Fabricolor Holding International) was substituted for the PEDOT:PSS dispersion. The near-infrared absorbing dye was also present at a concentration of 1 wt % instead of 0.5 wt % as in Example 1. The ink was tested in LAP 3-dimensional printing as in Example 1. The final part had a green color. The green color of the near-infrared absorbing dye can change at various conditions, such as elevated temperatures, oxygen exposure, light exposure, and UV exposure.

Example 4

A comparative ink was formulated using the same near-infrared absorbing dye as in Example 3, with the addition of a yellow pigment. The ink was tested in LAP 3-dimensional printing as in Example 1. The final part had a yellow color.

Example 5

The fusing efficiency was compared for the printed parts from Examples 1-4. The parts from Examples 1-2, printed using inks containing 0.5 wt % PEDOT:PSS, had a mass of 1.2 g. The part from Example 3, printed using ink containing 1 wt % of the near-infrared absorbing dye, had a mass of 0.8 g. The part from Example 4, printed using ink containing 1 wt % of the near-infrared absorbing dye plus a yellow pigment, had a mass of 1.4 g. The higher mass of the part from Example 4 is due to the contribution of the additional yellow pigment to the infrared absorption of the ink. The mass difference between the parts printed using clear PEDOT:PSS based inks and clear near-infrared dye based ink shows that powder fusing efficiency is greater with the PEDOT:PSS based inks. This increase in fusing efficiency can result in printed parts with better mechanical properties, such as tensile strength, tensile modulus, and elongation break.

Example 6

Figure 3:
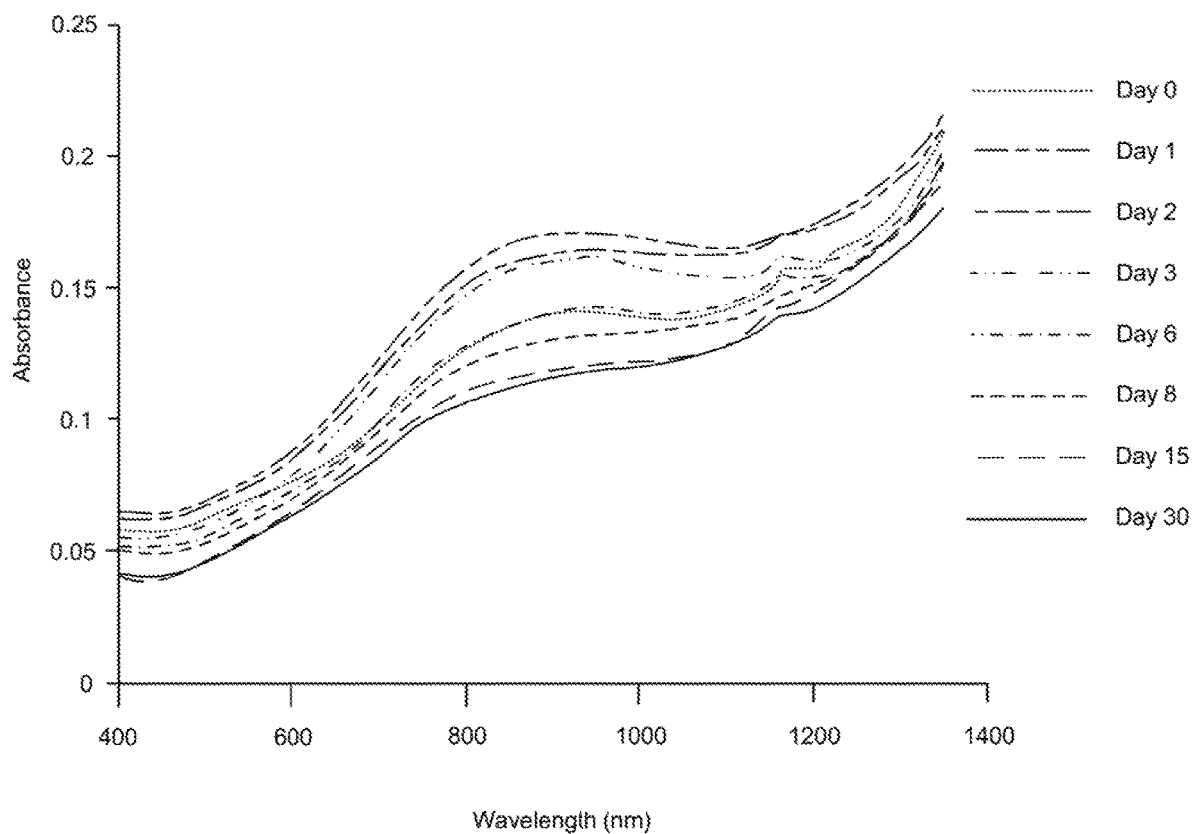
FIG. 3 illustrates absorption spectra of a dispersion of water-dispersible PEDOT:PSS over a period of 30 days in accordance with examples of the present disclosure.

A sample of PEDOT:PSS was tested for thermal stability. The absorption of the PEDOT:PSS was measured over a period of 30 days as the PEDOT:PSS was held at about 60° C. FIG. 3 shows a graph of absorbance vs. wavelength measured on days 0, 1, 2, 3, 6, 8, 15, and 30. From day 1 to day 30, the absorption was found to decrease slightly over time, which is likely due to phase separation of higher molecular weight polymer. However, the PEDOT:PSS was found to be sufficiently thermally stable for use in 3-dimensional printing processes involving high temperatures, such as the LAP process. The PEDOT:PSS was also much more thermally stable than the near-infrared absorbing dye used in Examples 3-4.

Example 7

A coalescent ink is prepared by mixing a Clevios™ PEDOT:PSS dispersion, water, and an ink vehicle prepared according to the ratio of chemicals in Table 6. The concentration of the PEDOT:PSS in the coalescent ink is 0.5 wt %. The remaining 99.5 wt % of the ink is a 30:70 mixture of the ink vehicle and water, respectively. In addition, additives such as Crodafos, PEI, glycerol or glycolic acid esters and ethers and or SDS surfactant can be added.

TABLE 6

| Ink Components | Wt % |
|---|---|
| 2-Pyrrolidinone | 75 |
| 2-Methyl-1,3-Propanediol | 7 |
| Tetraethylene glycol | 7 |
| LEG-1 | 6.36 |
| Surfynol ® CT151 surfactant from Air Products and Chemicals, Inc. | 0.99 |
| Zonyl ® FSO fluorosurfactant from DuPont | 0.09 |
| SMA1440H | 3.11 |
| Tris base | 0.45 |

TABLE 7

| Ink Components | Wt % |
| --- | --- |
| 2-Pyrrolidinone | 98.7 |
| Crodafos N3 ™ surfactant from Croda | 1.6 |

Example 9

Example 7 is repeated under similar conditions except using the ink vehicle from Table 8.

TABLE 8

| Ink Components | Wt % |
| --- | --- |
| 2-methyl-1,3-propanediol | 95.9 |
| Crodafos N3 ™ surfactant from Croda | 1.3 |
| Tergitol ™ 15-S-12 surfactant from Dow Chemical Company | 1.3 |
| Zonyl ® FSO-100 fluorosurfactant from DuPont | 1 |
| Proxel ™ GXL (20% as is) biocide from Lonza | 0.5 |

Example 10

Example 7 is repeated under similar conditions except using the ink vehicle from Table 9.

TABLE 9

| Ink Components | Wt % |
| --- | --- |
| 2-Hydroxyethyl-2-Pyrrolidone | 20.3 |
| Dantocol ™ DHE bonding agent from Lonza | 67.7 |
| LEG | 2.0 |
| Crodafos N3 ™ surfactant from Croda | 2.0 |
| Surfynol ® SEF surfactant from Air Products and Chemicals, Inc. | 6.8 |
| Kordek ™ MLX biocide from Dow Chemical Company | 0.6 |
| Proxel ™ GXL biocide from Lonza | 0.6 |

Example 11

Example 7 is repeated under similar conditions except using the ink vehicle from Table 10.

TABLE 10

| Ink components | Wt % |
| --- | --- |
| Tripropylene glycol | 52.5 |
| 1-(2-Hydroxyethyl)-2-imidazolidinone | 40 |
| LEG-1 | 2 |
| Crodafos N3 ™ surfactant from Croda | 2 |
| Tergitol ™ 15-S-7 surfactant from Dow Chemical Company | 2 |
| Zonyl ® FSO fluorosurfactant from DuPont | 1 |
| Proxel ™ GXL biocide from Lonza | 0.5 |

Example 12

Nylon 12 powder is heated to 150° C. in a bed. Then the coalescent ink according to one of Examples 7-11 is printed in the desired location to make a shape. Uniform temperature is maintained in the bed. An infrared lamp is then swept across the entire bed area to fuse the particles in the ink printed area. An additional layer of powder is next spread on the bed and the process continued to form a complete test part. The part is taken out of the powder bed and mildly sand blasted.

Example 13

The inks of Examples 7 to 11 are prepared to have a specific desired color by adding a colorant to the inks (in addition to the conjugated polymer, which is essentially colorless or imparts only a pale color in the amounts used). In this example, to each of these inks, 1 wt %, 2 wt %, 3.5 wt %, 5 wt %, or 7 wt % of any one of a cyan, magenta, yellow, or black pigment (self dispersed or dispersant dispersed) is added to the inks by replacing an equivalent amount of one or more of the major solvents, e.g., water, 2-pyrrolidinone, 2-methyl-1,3-propanediol, 2-hydroxyethyl-2-pyrrolidinone, etc., or an equivalent amount of the liquid vehicle as a whole.

What is claimed is:

1. A coalescent ink, comprising:
    a conjugated polymer;
    a colorant imparting a visible color to the coalescent ink, wherein the visible color is cyan, magenta, yellow, black, red, blue, green, orange, or violet; and
    an ink vehicle comprising a high boiling point co-solvent having a boiling point of 250° C. or greater, the high boiling point co-solvent present in an amount from about 1 wt % to about 4 wt % with respect to the coalescent ink.

2. The coalescent ink of claim 1, wherein the conjugated polymer is a water-dispersible conjugated polymer.

3. The coalescent ink of claim 1, wherein the conjugated polymer has a peak absorption wavelength from 800 nm to 1400 nm.

4. The coalescent ink of claim 1, wherein the conjugated polymer does not substantially alter the visible color of the coalescent ink.

5. The coalescent ink of claim 1, wherein the colorant is a dye.

6. The coalescent ink of claim 1, wherein the conjugated polymer is poly(3,4-ethylenedioxythiophene)-poly(styrenesulfonate) present at a concentration from about 0.02 wt % to about 10 wt % in the coalescent ink.

7. The coalescent ink of claim 6, wherein the coalescent ink, when jetted onto polymer particles in a sufficient amount to imparts a visible color, provides a concentration of poly(3,4-ethylenedioxythiophene)-poly(styrenesulfonate) from about 0.0003 wt % to about 5 wt % with respect to the polymer particles.

8. The coalescent ink of claim 7, wherein the colorant is a pigment having a concentration from about 0.5 wt % to about 10 wt % in the coalescent ink.

9. A material set, comprising:
    a coalescent ink according to claim 1 and
    a particulate polymer formulated to coalesce when contacted by the coalescent ink and irradiated by a near-infrared energy emitting the peak absorption wavelength.

10. The material set of claim 9, wherein the conjugated polymer comprises a dispersion of poly(3,4-ethylenedioxythiophene)-poly(styrenesulfonate) in water.

11. The material set of claim 9, wherein the coalescent ink further comprises a colorant imparting a visible color to the coalescent ink.

12. The material set of claim 9, wherein the particulate polymer is selected from the group consisting of nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, and mixtures thereof.

13. The material set of claim 9, wherein the particulate polymer has a melting or softening point from about 70° C. to about 350° C.

14. The material set of claim 9, wherein the coalescent ink, when printed on a portion of the particulate polymer, has a sufficient temperature boosting capacity so that the printed portion of the particulate polymer increases in temperature by at least 10° C. more than a non-printed portion of particulate polymer when both the printed portion and the non-printed portion are irradiated with a wavelength of about 800 nm to about 1400 nm.

15. The material set of claim 9, wherein the conjugated polymer has a peak absorption wavelength from 800 nm to 1400 nm.

16. A method for forming a 3-dimensional printed part, comprising:
   preheating a bed of particulate polymer to about 10° C. to about 70° C. below a melting point or softening point of the particulate polymer;
   jetting a coalescent ink according to claim 1 onto a portion of the bed of particulate polymer,
   irradiating the bed of particulate polymer with a fusing lamp configured to emit a wavelength from 800 nm to 1400 nm to cause the portion of the bed of particulate polymer to fuse;
   adding a layer of particulate polymer to the portion after fusing; and
   repeating the jetting, irradiating, and adding steps to form a part.

17. The method of claim 16, wherein the fusing lamp is configured to expose the entire bed of particulate polymer to a substantially uniform irradiation intensity.

18. The method of claim 16, wherein the conjugated polymer has a peak absorption wavelength from 800 nm to 1400 nm.

* * * * *